US011029049B2

(12) United States Patent
Gupta et al.

(10) Patent No.: US 11,029,049 B2
(45) Date of Patent: Jun. 8, 2021

(54) COLLABORATIVE ENERGY MANAGEMENT SYSTEM

(71) Applicant: Rensselaer Polytechnic Institute, Troy, NY (US)

(72) Inventors: Santosh K Gupta, Niskayuna, NY (US); Koushik Kar, Waterford, NY (US); Sandipan Mishra, Troy, NY (US); John T. Wen, Melrose, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 20 days.

(21) Appl. No.: 15/327,701

(22) PCT Filed: Aug. 14, 2015

(86) PCT No.: PCT/US2015/045218
§ 371 (c)(1),
(2) Date: Jan. 20, 2017

(87) PCT Pub. No.: WO2016/025802
PCT Pub. Date: Feb. 18, 2016

(65) Prior Publication Data
US 2017/0211837 A1     Jul. 27, 2017

Related U.S. Application Data

(60) Provisional application No. 62/037,146, filed on Aug. 14, 2014.

(51) Int. Cl.
*G05D 23/19* (2006.01)
*F24F 120/20* (2018.01)
(Continued)

(52) U.S. Cl.
CPC .............. *F24F 11/30* (2018.01); *F24F 11/62* (2018.01); *G05B 13/04* (2013.01);
(Continued)

(58) Field of Classification Search
CPC .... F24F 2110/00; F24F 2110/10; F24F 3/052; H05B 6/06; G21F 7/015; Y02B 70/3241
See application file for complete search history.

(56) References Cited

U.S. PATENT DOCUMENTS 8,374,725 B1 *  2/2013  Ols ..................... F24F 13/1426
                                                     700/277
2009/0281667 A1  11/2009  Masui et al.
(Continued)

FOREIGN PATENT DOCUMENTS

CN          1214130 A       4/1999

OTHER PUBLICATIONS

International Search Report and Written Opinion for PCT/US2015/045218 dated Nov. 30, 2015.

*Primary Examiner* — Kenneth M Lo
*Assistant Examiner* — Jonathan Michael Skrzycki
(74) *Attorney, Agent, or Firm* — Murtha Cullina LLP; Anthony P. Gangemi

(57) ABSTRACT

A collaborative energy management system, method and program product for a multi-zone space. A system is disclosed including: a plurality of environment sensors located throughout the multi-zone space; an adaptive learning system that collects environment data from the environment sensors and generates a correlation model that correlates historical environment data with HVAC settings; and an optimization system that utilizes the correlation model, inputted preferences received from a plurality of occupants within the multi-zone space, and energy usage goals to periodically generate new HVAC settings for controlling an HVAC system for the multi-zone space.

20 Claims, 12 Drawing Sheets

(51) Int. Cl.
  *F24F 11/30* (2018.01)
  *F24F 11/62* (2018.01)
  *G05B 13/04* (2006.01)
  *G05B 19/042* (2006.01)
  *F24F 120/10* (2018.01)
  *F24F 140/60* (2018.01)
  *F24F 11/64* (2018.01)
  *F24F 120/12* (2018.01)
  *F24F 11/46* (2018.01)
  *F24F 110/10* (2018.01)

(52) U.S. Cl.
  CPC ..... *G05B 19/0426* (2013.01); *G05D 23/1904* (2013.01); *G05D 23/1905* (2013.01); *G05D 23/1917* (2013.01); *G05D 23/1923* (2013.01); *G05D 23/1934* (2013.01); *F24F 11/46* (2018.01); *F24F 11/64* (2018.01); *F24F 2110/10* (2018.01); *F24F 2120/10* (2018.01); *F24F 2120/12* (2018.01); *F24F 2120/20* (2018.01); *F24F 2140/60* (2018.01); *G05B 2219/2614* (2013.01); *G05B 2219/2639* (2013.01)

(56) References Cited

U.S. PATENT DOCUMENTS

| | | | |
|---|---|---|---|
| 2011/0290893 A1 | 1/2011 | Steinberg | |
| 2012/0259469 A1* | 10/2012 | Ward | G05B 15/02 700/276 |
| 2013/0085614 A1* | 4/2013 | Wenzel | G05D 23/1923 700/277 |
| 2013/0204439 A1* | 8/2013 | Scelzi | G06Q 30/018 700/276 |
| 2015/0247646 A1* | 9/2015 | Song | G05D 23/1902 700/276 |
| 2016/0061469 A1* | 3/2016 | Albonesi | H02J 3/14 700/276 |
| 2018/0129172 A1* | 5/2018 | Shrivastava | G05B 13/0265 |

* cited by examiner

TABLE 1

| Parameter | Definition |
|---|---|
| $T \in \mathbb{R}^n$ | Temperature vector (of thermal capacitors) |
| $u \in \mathbb{R}^m$ | Heat input vector |
| $C \in \mathbb{R}^{n \times n}$ | Wall capacitances |
| $R \in \mathbb{R}^{l \times l}$ | Thermal resistors in the system |
| $D \in \mathbb{R}^{n \times l}$ | Incidence matrix |
| $B_0 \in \mathbb{R}^n$ | Thermal conductances of nodes connected to the ambient |
| $T_\infty \in \mathbb{R}^n$ | Ambient temperature |
| $B \in \mathbb{R}^{n \times m}$ | Input matrix |
| $T \in \mathbb{R}^m$ | Zonal temperature vector |

*FIG. 4*

TABLE 2

| User in Zone 1 | Ambient Temperature ($T_\infty$) | Occupant Temperature Preference ($x_{ij}$) | Optimal Zone 1 Temperature ($z_j^*$) | Occupant Pricing ($p_i$) |
|---|---|---|---|---|
| Discomfort Cost Only | | | | |
| Occupant 1 | 18°C | 17°C | 18°C | 3.4612 |
| Occupant 2 | 18°C | 19°C | 18°C | 3.4612 |
| Energy Cost Only | | | | |
| Occupant 1 | 18°C | 19°C | 18.8443°C | 1.0839 |
| Occupant 2 | 18°C | 19°C | 18.8443°C | 1.0839 |
| Both Discomfort & Energy Cost | | | | |
| Occupant 1 | 18°C | 17°C | 18.4222°C | 7.0005 |
| Occupant 2 | 18°C | 20°C | 18.4222°C | 8.6169 |

*FIG. 6*

TABLE 3

| Zone | Occupant Preference ($x_{ij}$) | Building Operator Preference ($z_j$) |
|---|---|---|
| Zone 1 | 19° C | 15° C |
| Zone 3 | 20° C | 15° C |
| Zone 4 | 21° C | 15° C |
| Zone 5 | 22° C | 15° C |
| Zone 6 | 23° C | 15° C |

TABLE 4

| Zone | Optimal Zonal Temperature ($z_j^*$) | Occupant Pricing ($p_i$) |
|---|---|---|
| Zone 1 | 19.0077° C | 0.0014 |
| Zone 3 | 19.8710° C | 0.3606 |
| Zone 4 | 20.5031° C | 2.5491 |
| Zone 5 | 21.3483° C | 4.7958 |
| Zone 6 | 21.2555° C | 17.1647 |

*FIG. 8*

TABLE 5

| Thermostat Setting $\Theta$ | Ambient Temperature $T_\infty$ | Sensor-1 Reading $y_1$ | Sensor-2 Reading $y_2$ | Sensor-3 Reading $y_3$ |
|---|---|---|---|---|
| 70°F ~ 21.1°C | 8°C | 24.5°C | 22°C | 19°C |
| 75°F ~ 23.9°C | 9°C | 26°C | 23.8°C | 20°C |
| 80°F ~ 26.7°C | 6°C | 26.6°C | 24°C | 20.4°C |
| 82°F ~ 27.8°C | 6°C | 27.7°C | 24.5°C | 21°C |
| 70°F ~ 21.1°C | -3°C | 23°C | 21°C | 16.4°C |
| 75°F ~ 23.9°C | -7°C | 24.5°C | 23°C | 18.3°C |

FIG. 12

COLLABORATIVE ENERGY MANAGEMENT SYSTEM

The invention was made with government support under contract number 1230687 awarded by the National Science Foundation. The government has certain rights in the invention.

TECHNICAL FIELD

The subject matter of this invention relates to energy management within a building or space, and more particularly to a collaborative energy management system.

BACKGROUND

Buildings that can maintain the indoor conditions as per the comfort level of its occupants, irrespective of the variations in the external weather, is one of the emerging expectations of a developed society. With changes in general living style and consumer expectations over the past decade, the demand for comfort levels have grown more and more personalized. These personal comfort level expectations pose a conflicting situation in multi-occupant spaces such as housing, corporate office buildings, student dorms, buses, airplanes etc., where each occupant has his or her own range of comfortable temperature distribution. This range also depends on the occupant's individual characteristics, including metabolism rate, age and external factors such as attire, physical and mental condition, and level of tolerance; this individual range can also vary depending on other environmental factors.

In shared multi-occupant spaces personal comfort levels are affected both by the presence of co-occupants and the correlation between the temperatures in the different zones and rooms occupied. Arriving at a consensus among all the occupants of different rooms and zones in a building is therefore an important but challenging problem. With the rising energy cost and emphasis on energy conservation, the total energy cost also needs to be accounted for when trying to achieve consensus among the occupants of a building.

Energy usage in buildings, both residential and commercial, accounts for one major source of energy consumption both within the US and worldwide. Data suggests that nearly 40% of the total energy consumption in the US, and 20% of the total energy consumption worldwide, is attributed to residential and commercial building usage. Numerous design and solution approaches have been proposed for efficient control and operation of building heating, ventilation, and air-conditioning (HVAC) systems. Unfortunately, none provide an approach that comprehensively addresses the challenges of providing individual comfort and energy efficiency in shared multi-occupant spaces.

SUMMARY

The disclosed solution provides a collaborative energy management system that adaptively learns the thermal correlations between multiple zones through temperature and energy flow measurements in each zone. This information is then used for coordinated (joint) control of all thermal zones together, instead of controlling the temperature/energy flows in each zone separately.

The system further allows occupants to provide their comfort preferences/feedback using mobile apps or the like via a server managing the collaborative energy management system for a space, such as a building, home, airplane, bus, dorm, etc. The preferences are used along with the overall energy cost information of the space to jointly optimize (trade off) the energy cost and occupant discomfort, taking into account the multi-zone thermal correlation model.

The system also provides a process to correctly calculate the thermal energy usage (i.e., pricing signals) by individual occupants sharing a common space, based on their temperature preference information. The process is such that it invokes truthful feedback from the occupants about their current comfort levels or comfortable temperature ranges.

In a first aspect, the invention provides a collaborative energy management system for a multi-zone space, comprising: a plurality of environment sensors located throughout the multi-zone space; an adaptive learning system that collects environment data from the environment sensors and generates a correlation model that correlates historical environment data with HVAC (heating ventilation air conditioning) settings; and an optimization system that utilizes the correlation model, inputted preferences received from a plurality of occupants within the multi-zone space, and energy usage goals to periodically generate new HVAC settings for controlling an HVAC system for the multi-zone space.

In a second aspect, the invention provides a method of providing collaborative energy management in a multi-zone space, comprising: collecting environment data from sensors in the multi-zone space to generate a correlation model that correlates historical environment data with HVAC settings; receiving preferences from a plurality of occupants within the multi-zone space; receiving energy usage goals for the multi-zone space; calculating new HVAC settings for the multi-zone space with a consensus algorithm utilizing the correlation model, preferences, and energy usage goals; and applying the HVAC settings to an HVAC system associated with the multi-zone space.

In a third aspect, the invention provides a computer program product stored on a computer readable medium, which when executed by a computer system, provides collaborative energy management in a multi-zone space, comprising: program code that collects environment data from sensors in the multi-zone space to generate a correlation model that correlates historical environment data with HVAC settings; program code that receives preferences from a plurality of occupants within the multi-zone space; program code that receives energy goals for the multi-zone space; program code that calculates new HVAC settings for the multi-zone space with a consensus algorithm utilizing the correlation model, preferences, and energy goals; and program code that outputs the HVAC settings to an HVAC system associated with the multi-zone space.

BRIEF DESCRIPTION OF THE DRAWINGS

These and other features of this invention will be more readily understood from the following detailed description of the various aspects of the invention taken in conjunction with the accompanying drawings in which:

FIG. 4 depicts a table of parameters according to embodiments.

FIG. 6 depicts a table showing occupant information according to embodiments.

FIG. 8 depicts a pair of tables showing zone information according to embodiments.

FIG. 12 depicts a table showing sensor readings according to embodiments.

Figure 1:
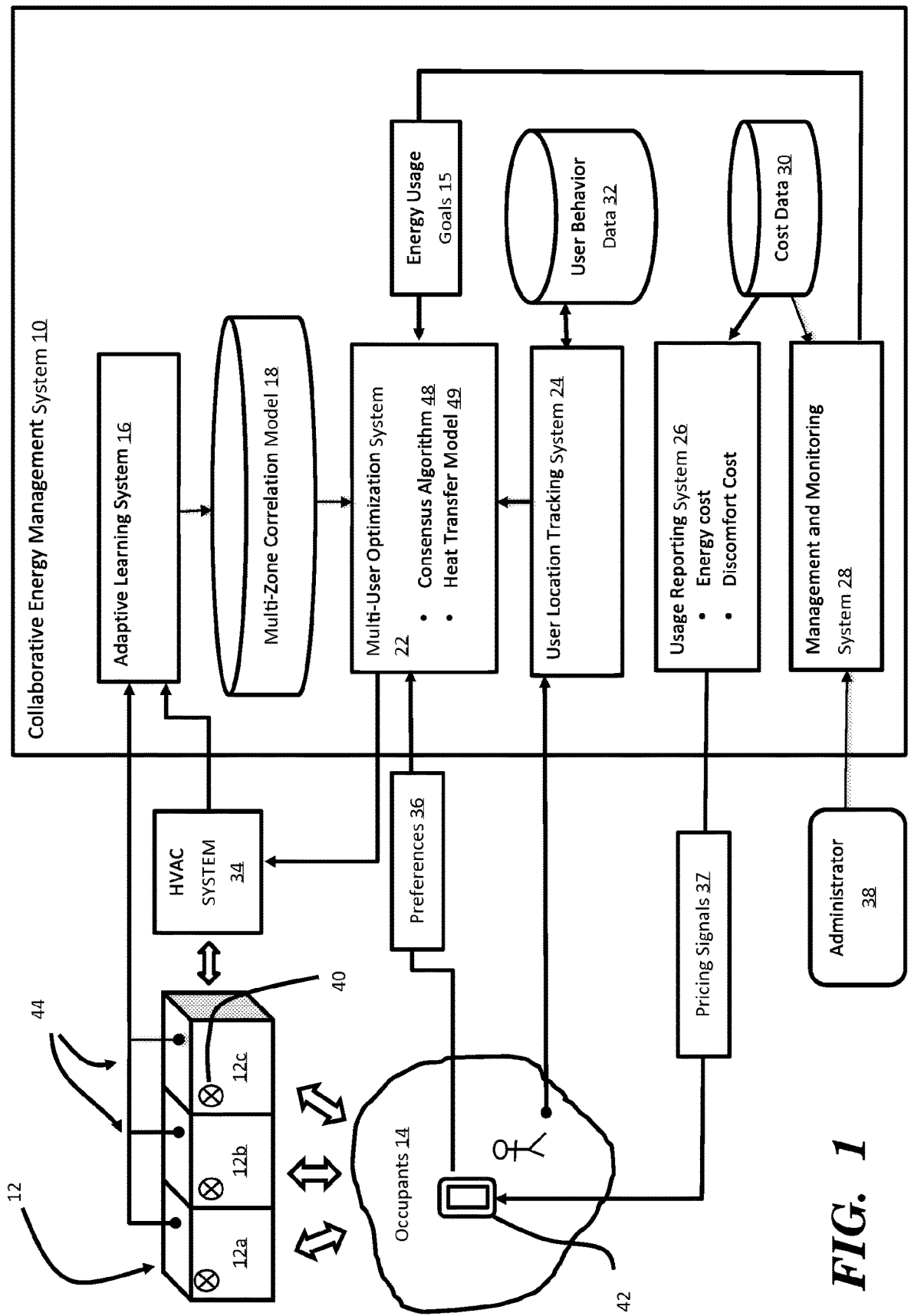
FIG. 1 depicts a collaborative energy management system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring to the drawings, FIG. 1 depicts a collaborative energy management (CEM) system 10 for managing HVAC (heating ventilation air conditioning) settings within a space 12. Space 12 generally comprises any number of zones 12a, 12b, 12c, which may for example comprise rooms, offices, cubicles, areas, beds, seats, etc. Space 12 generally utilizes one or more thermostats or other similar devices for controlling the HVAC settings for an associated HVAC system 34. In some instances, zones such as rooms may have individual thermostats; in other instances, a single thermostat may be used to control an entire space 12; and in still other instances, a small number of thermostats may be used to control a larger number of zones, etc. Although generally described herein as controlling traditional HVAC processes, HVAC system 34 may comprise any system for controlling comfort parameters within space 12, e.g., heating, cooling, air flow, raising and lowering of blinds, opening and closing of windows, lighting, water temperature, etc.

Space 12 is adapted for use by a set of occupants (or "users") 14, who have access to an application 42, e.g., an app running on a smartphone, computer, voice recognition system, etc., for inputting individual preferences 36 to the CEM system 10. Thus, for example, occupants 14 may comprise household members, workers in an office building, passengers on a plane, etc. Individual preferences 36 may for example comprise temperature preferences, time settings, air flow preferences, etc. As described herein, a goal of CEM system 10 is to provide environmental conditions within space 12 that optimally balance the disparate preferences 36 of individual occupants 14 and energy usage goals 15 established for the space 12 by an administrator 38 or the like.

To achieve this, CEM system 10 includes an adaptive learning system 16 that collects environment data from a set of environment sensors 44 within or outside space 12. Environment data may include temperature and energy flow measurements in each zone, thermal correlations between zones, hot spots and cold spots, the impact of the outside environment on individual zones, HVAC settings, etc. Environment data is utilized to create a multi-zone correlation model ("correlation model") 18 that models various environment conditions and results, e.g., temperature as a function of time and date, location, ambient conditions, etc. Accordingly, correlation model 18 may for example be used to model conditions based on historical data, e.g., during morning hours in the winter, zone 12a is known to be three degrees colder than the thermostat setting; or zone 12b is generally two degrees warmer than zone 12c; etc. Any number or type of environmental sensors 44 may be utilized to collect environment data.

Also included in CEM system 10 is a multi-user optimization system 22 that inputs user preferences 36, energy usage goals 15 and information from the correlation model 18 to dynamically generate settings for HVAC system 34 to jointly optimize energy costs and occupant comfort (or discomfort). For instance, knowing how the space 12 will behave in response to HVAC settings under current circumstances (from the correlation model 18), multi-user optimization system 22 will employ a consensus algorithm 48 to meet the preferences 36 of occupants 14 and energy usage goals 15 set for the space 12. Thus for example, in a single thermostat space 12, a first occupant in a "colder" zone may prefer a higher temperature while a second occupant in a "warmer" zone may prefer a colder temperature. In this case, multi-user optimization system 22 provides HVAC settings to HVAC system 34 to best balance the preferences of the two occupants, while attempting meet any predefined energy cost goals. Energy usage goals 15 may comprise any goal or target set for the entire space 12, including cost goals for energy consumption, target temperature settings, etc.

The multi-user optimization system 22 may be further enhanced with a user location tracking system 24, which provides real time location information of occupants 14 in the space 12. Thus, as occupants 14 move throughout the space 12, their preferences 36 can follow them. For example, a family member in his or her bedroom may submit a temperature preference 36 via a smartphone application 42, but then move to the family room to watch a movie. Multi-user optimization system 22 would utilize the tracking information to adjust the HVAC settings to try to meet the temperature preference 36 of the family member in the family room. User tracking may be done in any manner. In one embodiment, user tracking may be done with tracking sensors 40 placed throughout the space 12 that can track people. In another embodiment, user behavior data 32 may be collected and relied upon to predict where occupants 14 will be a different times. For instance, it may be determined that particular occupants tend to congregate in the cafeteria during lunch time, while others tend to eat lunch in their offices. In still another embodiment, location information (e.g., GPS, etc.) from an occupant's smart phone may be utilized to track location information. In still another embodiment, ancillary information, such as whether an occupant is logged into their computer, watching TV, running water in the shower, etc., may be used to ascertain location information.

Also provided in CEM system 10 is an energy usage reporting system 26 that provides occupants 14 with individual feedback, such as pricing signals 37, about their personal energy consumption costs, based on their selected preferences 36. For example, two occupants sharing an office will receive personal real time data about the impact of their preferences 36 on energy consumption costs. The occupant 14 who prefers colder temperatures in the summer and warmer temperatures in the winter will have a higher pricing signal 37 (i.e., greater energy cost) than the occupant who does not have those preferences. Pricing signals 37 may comprise any type of information that reflects a personalized energy impact for each occupant. Illustrative pricing signals may, e.g., include a value, ranking, rating, cost, credit, etc.

Finally, a management and monitoring system 28 is provided for administrators 38, such as homeowners, building managers, utility companies, etc. Using the management and monitoring system 28, administrators 38 can set energy consumption usage goals 15, visualize historical thermal data and carry out analytics via a graphical user interface. They can observe energy usage trends at a zonal level, and track occupants 14 who abuse energy usage or identify rooms with energy leakage. The administrators 38 can remotely adjust/set the temperature settings at a zonal level to address over consumption or wastage of energy. Management and monitoring system 28 can also be utilized to provide occupants with incentives or be penalized based on their energy usage data.

The following description provides a detailed approach for implementing CEM system 10, including illustrative consensus algorithms 48 for energy efficient operation of buildings based on the preference and feedback of its occupants 14. Reference is made to FIG. 1 throughout the discussion. Although the CEM system 10 can be utilized to control any type of environmental conditions, the following description focuses primarily on temperature settings for simplicity of the discussion.

Consensus algorithm 48 correlates the comfort (or discomfort) level of the occupants 14 to the current HVAC settings. As noted, environment sensors 44 throughout the space 12 feed real time zonal temperature (and other related environment parameters) to the adaptive learning system 16. The sensor readings are used to create the multi-zone correlation model 18 that aids the consensus algorithm 48 with controlling the environment of the occupant space 12.

Figure 2:
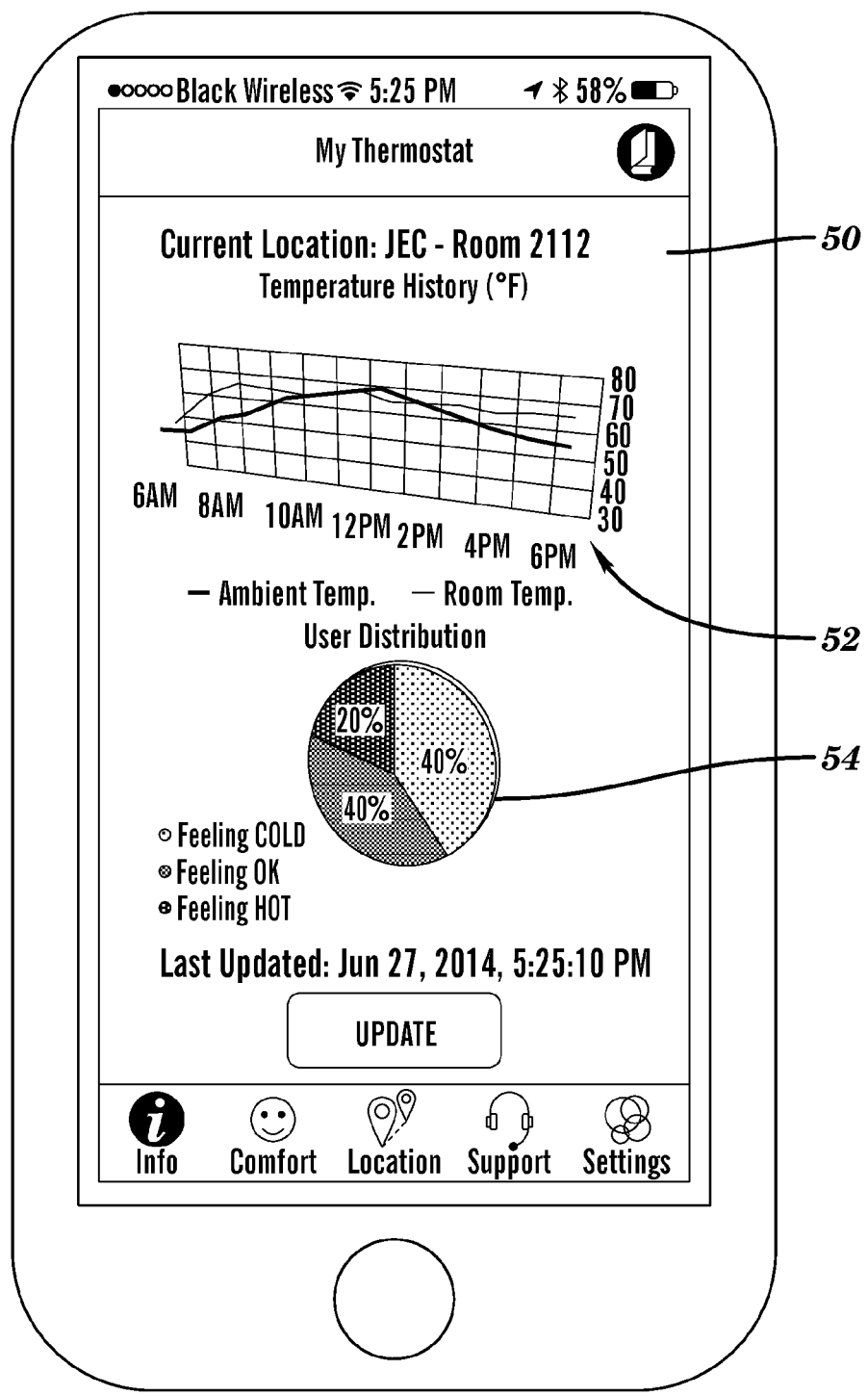
FIG. 2 depicts a user interface on a smart device for viewing environment information according to embodiments.
Figure 3:
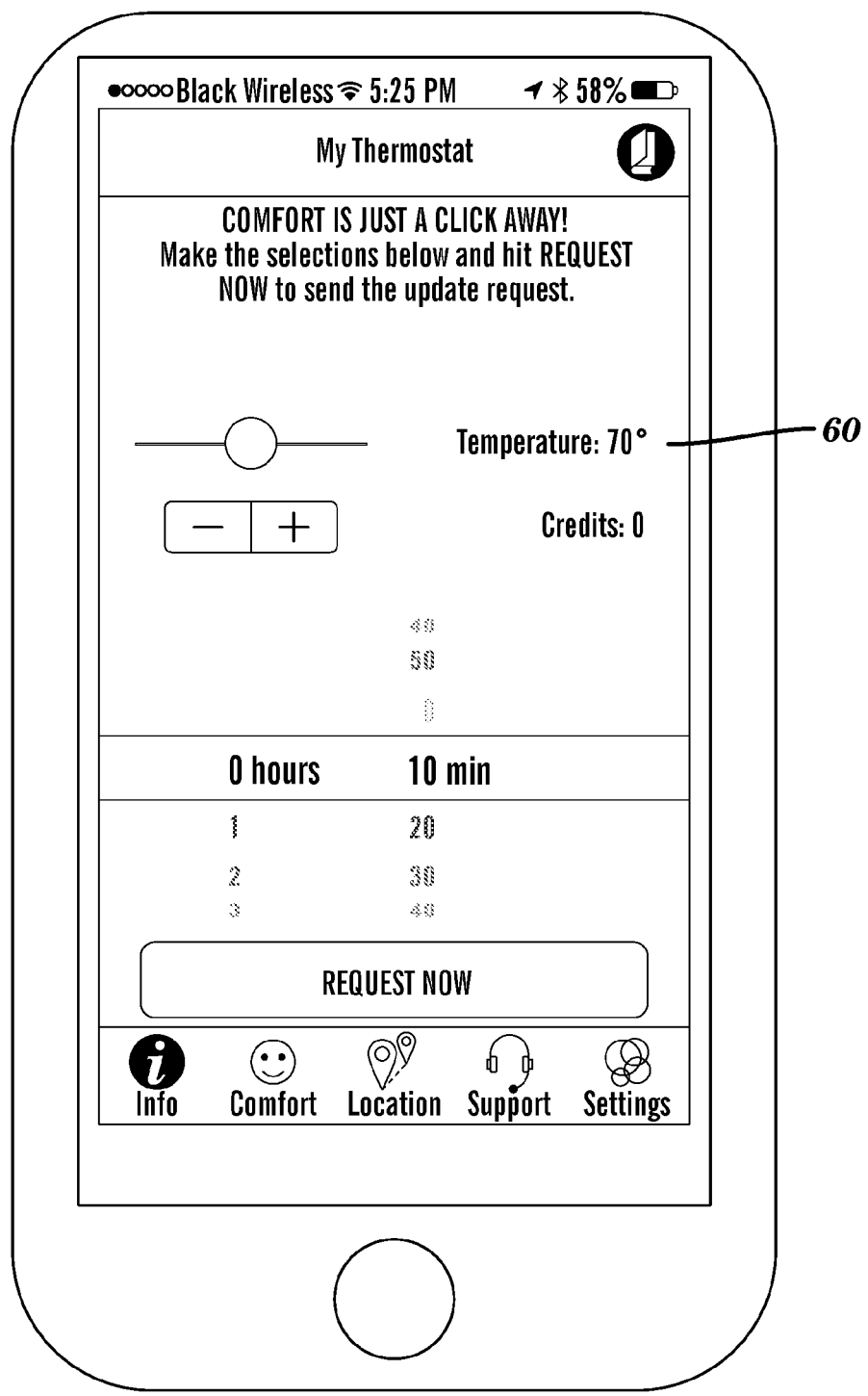
FIG. 3 depicts a user interface on a smart device for inputting user preferences according to embodiments.

Occupants 14 can use their smart phones (or other devices) to access, e.g., a mobile application 42, and provide their temperature preferences 36. In FIGS. 2 and 3, two illustrative screen shots of a mobile application are shown. FIG. 2 shows an information interface 50 that includes a plot 52 over time of room temperature and ambient temperature for the occupant's current location. Ambient temperature generally refers to the outside temperature, or temperature that would result but for HVAC system 34. Interface 50 also shows the percentage distribution 54 of the occupant comfort in the zone based on occupant preferences for the given zone. For example, 40% of the occupants feel cold, meaning that their temperature preference is higher than the current zone temperatures. The displayed information may be auto updated at specific intervals, or via an update request generated by the occupant 14 manually.

FIG. 3 depicts a preference interface 60 through which the user can input their temperature preference 36, as well as set timing for the preference. Preference interface 60 also provides pricing signals regarding the occupant's use of energy (e.g., "credits" may be provided to individual occupants 14 by conserving energy). Using preferences 36, consensus algorithm 48 estimates information on a discomfort function for a set of occupants in the space.

The consensus algorithm 48 may utilize a minimization objective that is an aggregate of all the occupant discomfort functions and the total energy cost, subject to the constraint of a common temperature set-point for each zone. Pricing per unit temperature change serves as the pricing signal 37 that may be fed back to the occupants 14, to drive them to declare their truthful temperature preference 36, which optimizes the overall discomfort and energy cost objective as mentioned above. Consensus algorithm 48 accordingly inherently prevents abusive occupants (or their agents) from taking advantage of the system through malicious preference settings 36. The algorithm 48 achieves the optimal zonal temperatures, from which the occupants 14 do not have an incentive to deviate. The occupant preferences 36 obtained through the smart phone application and the sensor measurements are used by the CEM system 10 under control of a building manager or administrator 38 to determine the optimal zonal temperatures (i.e., energy usage goals 15).

Once calculated, the HVAC system 34 is set to provide the optimal zonal temperature settings. For an integrated system such as that shown in FIG. 1, the thermostat(s) can be automatically set to the calculated temperature setting.

In order to implement such an energy efficient temperature control system, a building heat transfer model 49 may be utilized by the optimization system 22. Various building modeling strategies have been proposed and could be utilized, including a finite element method based model, a lumped mass and energy transfer model, and a graph theoretic model based on electrical circuit analogy. The heat transfer model 49 selection entails a trade-off between computational efficiency and accuracy of representation of the temperature dynamics. The electrical analogy approach to modeling multiple interconnected zones is attractive because it reduces the heat transfer model 49 to an equivalent electrical circuit network. The model can be further modified to include building occupancy, room and heating equipment dynamics.

In this example, the electrical circuit analogy approach is described, which is combined with a distributed consensus algorithm 48 to achieve collaborative temperature control of buildings. A building is modeled as a collection of interconnected zones, with energy/temperature dynamics evolving according to a lumped heat transfer model. In the lumped heat transfer model, a single zone is modeled as a thermal capacitor and a wall is modeled as an RC network. This results in the standard lumped 4R3C wall model. The heat flow modeling is based on temperature difference and thermal resistance: $Q=\Delta T/R$, where $\Delta T$ is the temperature difference, R is the thermal resistance and Q is the heat transferred across the resistance. This is analogous to the current due to voltage difference across a resistor. Also, note that the thermal capacitance denotes the ability of a space to store heat: $C\,d\Delta T/dt=Q$. The heat flow and thermal capacitance model can be written for all the thermal capacitors in the system, with Ti as the temperature of the ith capacitor. Consider a system with n thermal capacitors and 1 thermal resistors. Taking the ambient temperature ($T\infty$) into account, and neglecting any "thermal noise" in the system, the overall heat transfer model of the system with m zones may be written as:

$$C\dot{T}=-DR^{-1}D^{T}T+B_{0}T\infty+Bu \quad (1)$$

where $T \in R^n$ is the temperature vector (representing the temperature of the thermal capacitors in the model), $u \in R^m$ is the vector of heat inputs into the different zones of the building, and $B \in R^{n \times m}$ is the corresponding input matrix. Also, note that (T, u) are functions of time (T(t), u(t)) and accordingly $\dot{T}=dT/dt$. Note that positive values of u correspond to heating the system while negative values of u correspond to cooling. In the above equation, $T \in R^{n \times n}$ consists of the wall capacitances and is a diagonal positive definite matrix; $R \in R^{l \times l}$ consists of the thermal resistors in the system and is a diagonal positive definite matrix as well. Also, $D \subset R^{n \times l}$ is the incidence matrix, mapping the system capacitances to the resistors, and is of full row rank, and $B_0 = -DR^{-1}d_0^T \in R^n$ is a column vector with non-zero elements denoting the thermal conductances of nodes connected to the ambient.

In the heat transfer model 49, the zones are picked such that each has a heating/cooling unit, which in turn implies that B is of full row rank. Also, since matrix D is of full row rank the product $DR^{-1}D^T$ is a positive definite matrix. The vector of zone temperatures, denoted by y (which is a function of T) can be expressed as, $$y = B^T T. \qquad (2)$$

Table 1 in FIG. 4 depicts a snapshot of the above parameters.

The multi-user optimization system 22 (FIG. 1) may thus be implemented as follows. Consider a building with m zones, and let Sj represent the set of occupants located in zone j of the building. Let Di represent the discomfort function of occupant i, and function E the overall energy cost. Then a reasonable objective is to attain (in steady state) the zonal temperature vector y that achieves the following objective:

$$\text{minimize} \sum_{j=1}^{m} \sum_{i \in S_j} D_i(y_j) + E(u). \qquad (3)$$

where $y_j$ is the temperature of zone j, and u is the heat input vector that is required to attain those zonal temperatures. Note that an occupant i located in zone j (i.e., i∈Sj) experiences temperature $y_j$, and therefore its discomfort can be represented as $D_i(y_j)$. It is assumed the discomfort function $D_i(y_j)$ is convex in its argument $y_j$. It is worth noting that the discomfort function need not be "strictly" convex. This allows for the occupants 14 to be insensitive to temperature fluctuations over a certain range; or in other words, the discomfort function could be flat over the occupant's comfort range. In the above, E(u) is assumed to be a convex function of the control input vector u. For the sake of definiteness, E(u) is of the following quadratic form (although other convex forms of the function E(u) are also allowed by the framework):

$$E(u) = u^T \Gamma u, \qquad (4)$$

Where Γ is a positive definite matrix. The Γ matrix captures the weight of the energy cost relative to the total discomfort cost. In practice, it could be determined by the actual cost of energy, as well as additional input from the building operator to determine how much relative weight to associate with the energy cost as compared to the occupant discomfort costs.

Finally, since the optimization variable in the objective function (3) is only the zonal temperature vector y, the relationship between the heat input vector u and the zonal temperature vector y needs to be stated to make the formula meaningful. This relationship can be derived from (2), using the steady state condition in (1) (i.e., setting $\dot{T}=0$). This gives $$u = g(y) \doteq (B^T A^{-1} B)^{-1} (y - B^T A^{-1} B_0 T_\infty), \qquad (5)$$

where $A = DR^{-1}D^T$.

Then using equation (5), the energy cost E(u) is written as G(y)=E(g(y)). It can be seen that the function G(y) is convex in y. If the individual occupant discomfort functions are assumed to be known to the building operator, the optimal zonal temperature vector y* could be computed directly. However, such a centralized approach suffers from several practical limitations. Firstly, reporting the entire discomfort function to the building operator is complex for the occupants 14, and they may not even be able to correctly estimate the discomfort function. Secondly, even if the occupants 14 know their discomfort function exactly, there is no incentive for them to report the same truthfully.

In practice, therefore, it may be more desirable to have a mechanism through which the administrator 38 (building operator) indirectly learns about the true discomfort functions of the occupants 14, who are providing their temperature preference feedback in a simple and convenient format, acting in best response to some pricing signals 37 provided by the administrator 38. Furthermore, the pricing signals 37 should be such that it guides the occupants 14 towards a common temperature set-point for each zone. The consensus algorithm 48 works according to the above principles.

The following notations are utilized for an illustrative consensus algorithm 48. Let $x_{ij}$ denote the desired temperature of occupant i∈$S_j$ located in zone j, and let $z_j$ denote the target temperature of zone j as preferred by the management and monitoring system 28. Vector z then represents the target temperature of the entire building consisting of m zones. In general, individual preference $x_{ij}$ of an occupant i∈$S_j$ can differ from $z_j$. Note that the actual zonal temperature $y_j$ could also differ from these temperatures. The algorithm motivated pricing signals ensure that $x_{ij}$ for all occupants i∈$S_j$ equals $z_j$, which optimizes the objective function in equation (3) subject to equation (5). z* is used to denote the optimal temperature set-point vector for the building.

In general, the management and monitoring system 28 would not know the discomfort function of the occupants. In one illustrative embodiment, pricing signals 37 provide feedback to the occupants 14 that can induce the occupants 14 to declare their comfort truthfully and efficiently. This may be achieved by setting the pricing signal 37 for an occupant i in zone j as the opportunity cost caused by his or her presence and the corresponding discomfort function $D_i(y_j)$.

Consider the minimization objective in equation (3) in terms of the zonal temperature choices of the occupants and the building management system, as:

$$\text{minimize} \sum_{j=1}^{m} \sum_{i \in S_j} D_i(x_{ij}) + G(z) \qquad (6)$$

$$\text{subject to } x_{ij} = z_j, i \in S_j,$$

where function G(z)=E(g(z)) represents the total energy cost in terms of the target zonal temperature vector z. With energy as an elastic resource, es-MSP may be used to obtain the pricing signal 37 ($p_i$) for an occupant i as:

$$p_i = \left( \sum_{j=1}^{m} \sum_{i \in S_j} D_i(z_j^*) + G(z^*) \right) - \left( \sum_{j=1}^{m} \sum_{i \in S_j} D_{-i}(z_j^*) + G_{-i}(z^*) \right), \qquad (7)$$

where z* denotes the optimal temperature set-point vector and $z_j^*$ the corresponding component for zone j. Note that the functions $D_{-i}(\cdot)$ and $G_{-i}(\cdot)$ denote the values corresponding to the absence of user i from the building. The pricing signal 37 or value in equation (7) refers to the additional cost of building operation that is incurred due to the presence of user i and the associated discomfort function $D_i(\cdot)$. This pricing value 37 has to account for the opportunity cost associated with the presence and preference of the occupant 14. The pricing signal 37 can be considered to include two separate components: the first pertaining to the discomfort cost incurred to the co-occupants due to the temperature preference of occupant i and the second component is the incremental energy cost to the building system to accommodate the preference of the ith occupant.

Once the optimal temperature set-point vector z* for the building has been obtained, the objective of the design is to drive all the zones in system of equation (1) to their corresponding consensus temperature $z^*_j$ in steady state. Using the steady state condition $\check{T}=0$ in equation (1) and (2), the steady state temperature $y_{ss}$ can be obtained as, $$y_{ss} = B^T A^{-1} B_0 T_\infty + B^T A^{-1} Bu, \quad (8)$$

The corresponding steady state input $u_{ss}$ is given by $$u_{ss} = g(y_{ss}) \quad (9)$$
$$= (B^T A^{-1} B)^{-1}(y_{ss} - B^T A^{-1} B_0 T_\infty).$$

This steady state function was used in equation (4) to obtain the total energy cost function $G(y)=E(g(y))$.

There are various choices for picking a stabilizing controller for building thermal control, such as hysteresis controller, feed forward controller, proportional feedback controller, etc. Any of these, with suitable adaptation, can be used to achieve the desired steady state zonal temperatures for the system in equation (1). A model based feed forward controller u* from the steady state input in equation (9) may for instance be used, with the steady state temperature $y_{ss}$ as the optimal temperature z*:

$$u^* = (B^T A^{-1} B)^{-1}(z^* - B^T A^{-1} B_0 T_\infty). \quad (10)$$

However, the feed forward controller alone leads to a very slow convergence which might not be acceptable for a building temperature application owing to the associated occupant discomfort duration. To compensate for the slow convergence, a passive feedback component may be added to design the control as:

$$u = u^* - K(y - z^*). \quad (11)$$

This feed forward and proportional feedback controller can thus be used to drive the system to the optimal temperature vector z*.

Figure 5:
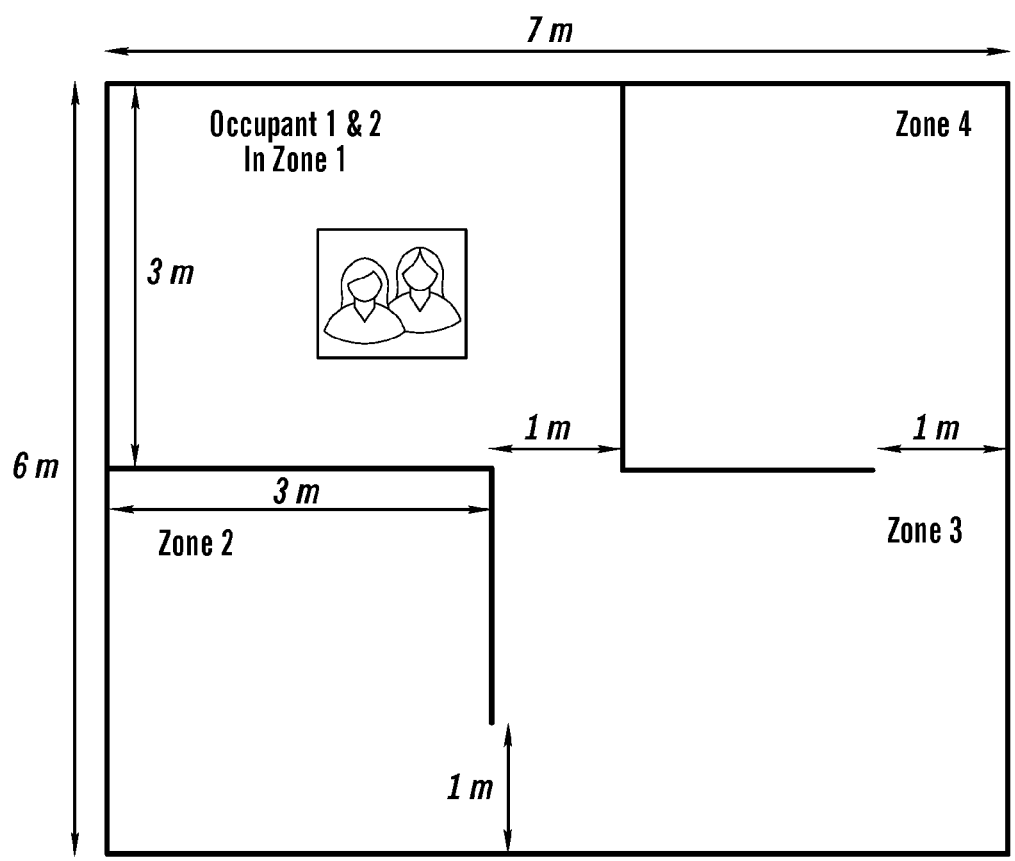
FIG. 5 depicts a four zone floorplan of a space according to embodiments.

As noted, user reporting system 26 provides pricing signal 37 as feedback to the occupants 14 that elicit more truthful temperature preferences 36 from the occupants 14. This pricing signal 37, which is the opportunity cost, has two components to it: the energy cost and the discomfort cost. Consider a four room space as shown in FIG. 5. Each wall is represented using 3R2C wall model. Using volumetric heat capacity and thermal resistance values, the heat transfer model 49 of four rooms and eight walls is modeled by 20 capacitive and 27 resistive elements. The occupancy is as shown in FIG. 5, with two occupants in Zone 1 and the remaining three zones are unoccupied. The results are presented in table 2 shown in FIG. 6.

For this example, a quadratic occupant discomfort function is assumed of the form: $(y_j - x_{ij})^2$, where $y_j$ is the temperature of the zone j and $x_{ij}$ is the ideal preferred temperature of occupant i in zone j, and an ambient temperature (T∞) of 18 degrees C. In a first example, assume a temperature preference of occupant 1 as 17 degrees C. and that of occupant 2 as 19 degrees C. Solving the optimization problem (equation 6), the optimal zonal temperature comes out to be 18 degrees C., which is the ambient temperature and hence there is no energy cost associated with maintaining the zone at this optimal temperature. The opportunity cost of each occupant 14 is then just the discomfort that they cause to each other. Using equation (7) the pricing signal 37 ($p_i$) of each occupant is obtained as 3.4612.

In the next case, the preferred temperature for both the occupants is 19 degrees C. Since both have the same preference there is no discomfort cost associated with their preferences. The optimal temperature turns out to be 18.8443 degrees C., and the pricing signal 37 of 1.0839 per occupant indicates the energy cost they incur to the building thermal system. In this scenario the opportunity cost of each occupant just consists of the energy cost.

In a final case, consider occupant 1 with a temperature preference of 17 degrees C. and occupant 2 with a preference of 20 degrees C. Note that in this case the opportunity cost or the pricing signal 37 for each occupant 14 would have both the energy and the discomfort cost associated with it. The optimal temperature for zone 1 is obtained as 18.4222 degrees C., which deviates from both the ambient temperature and the preference of each occupant, hence incurring both energy and discomfort cost. The pricing signals 37 of 7.0005 and 8.6169 for occupant 1 and occupant 2, respectively, has both the energy and discomfort cost components built in. The higher pricing signal of occupant 2 can be attributed to the greater deviation of second occupant's preference from the ambient temperature, resulting in higher energy and discomfort costs.

Figure 7:
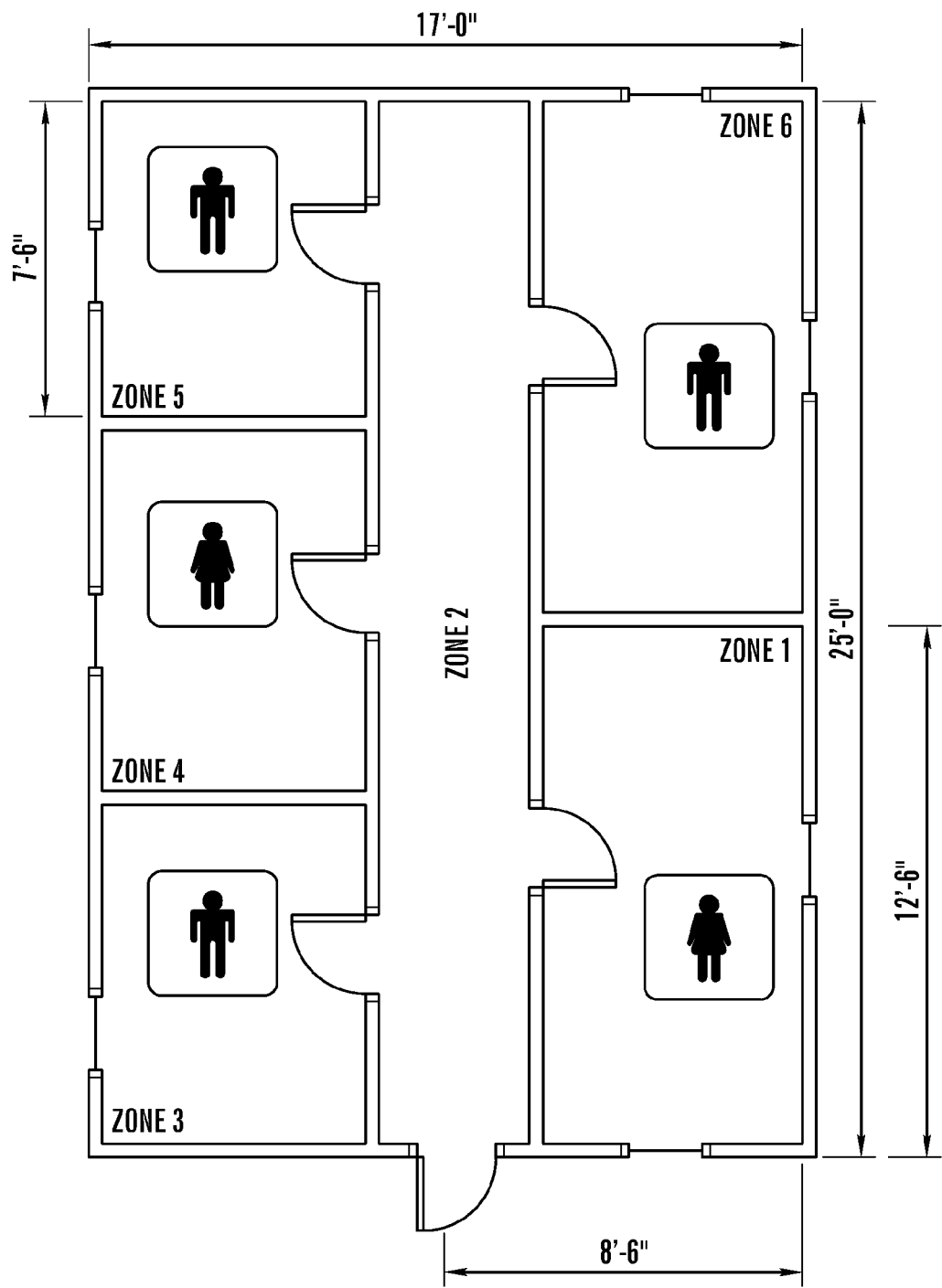
FIG. 7 depicts a six zone floorplan of a space according to embodiments.
Figure 9:
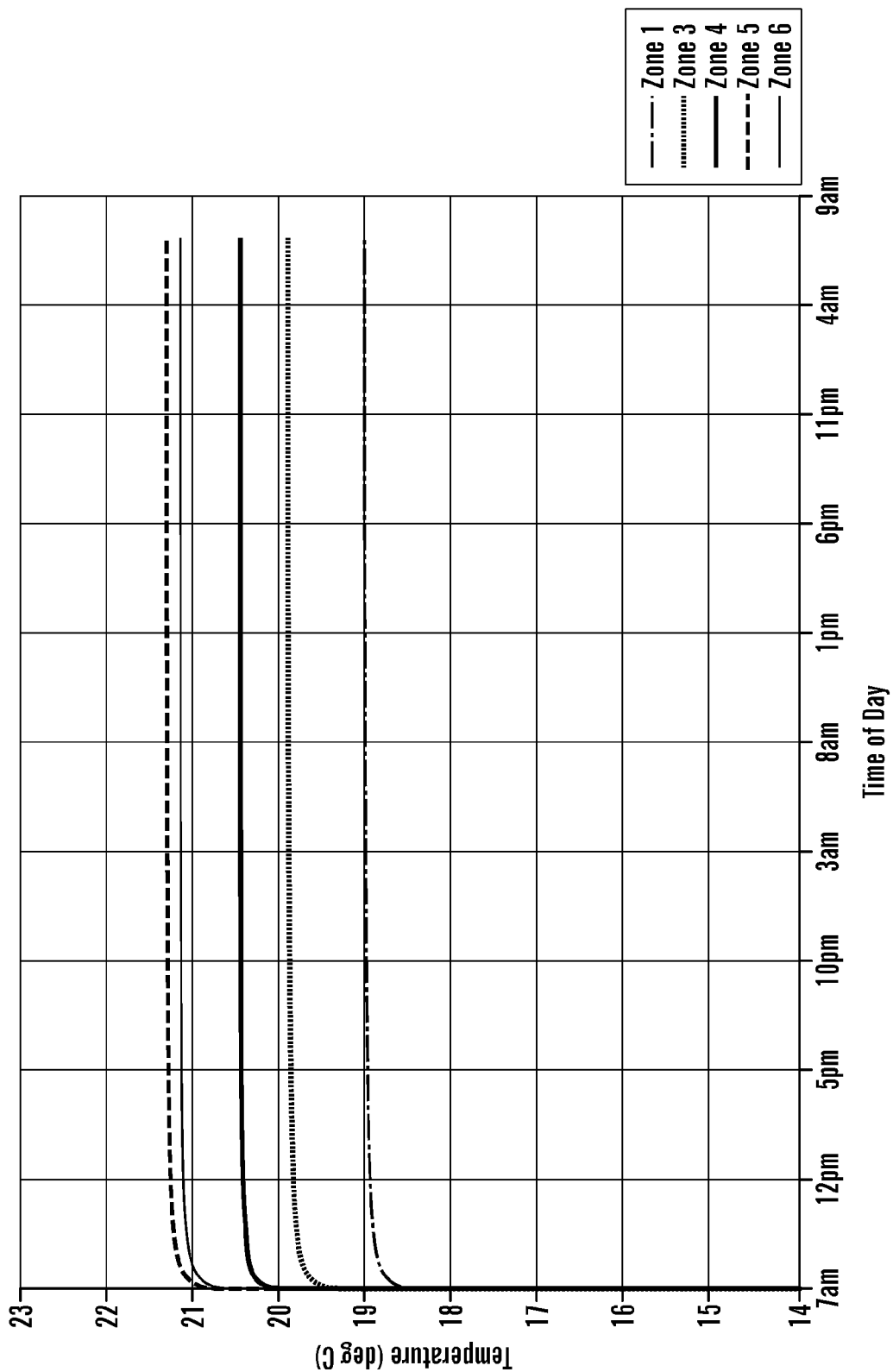
FIG. 9 depicts a plot of temperatures in different zones according to embodiments.

In a further example, the temperature dynamics using equation (1) and control law from equation (11) are provided over a 48 hour period for a more complex six zone space as shown in FIG. 7. As shown, zones 1, 3, 4, 5, and 6 are each occupied by one occupant, each having a specific temperature preference. Once again a quadratic occupant discomfort function is assumed with the occupant temperature preference as per Table 3 in FIG. 8, and ambient temperature at T1=18 degrees C. The optimal solution z* is obtained by solving equation (6), which is then used in equation (7) to solve for the pricing signal 37 corresponding to each occupant 14. The corresponding results are presented in Table 4 of FIG. 8. Using the optimal temperature set-points of the zones $z^*_j$ as per Table 4, the temperature variation of the building for a 48 hour period using the heat transfer model in equation (1) can be simulated to provide an example scenario. The simulation results of the temperature dynamics for a 48 hour period are presented for the six zone model in FIG. 9, which may for example be reported back to management and monitoring system 28. The temperature of each zone converges to the desired $z^*_j$ value, as can be observed in the figure. Note that the simulation presented in FIG. 9 refers to uninterrupted occupancy of users which is not always a real world scenario as the occupants 14 would typically be moving in and out.

Figure 10:
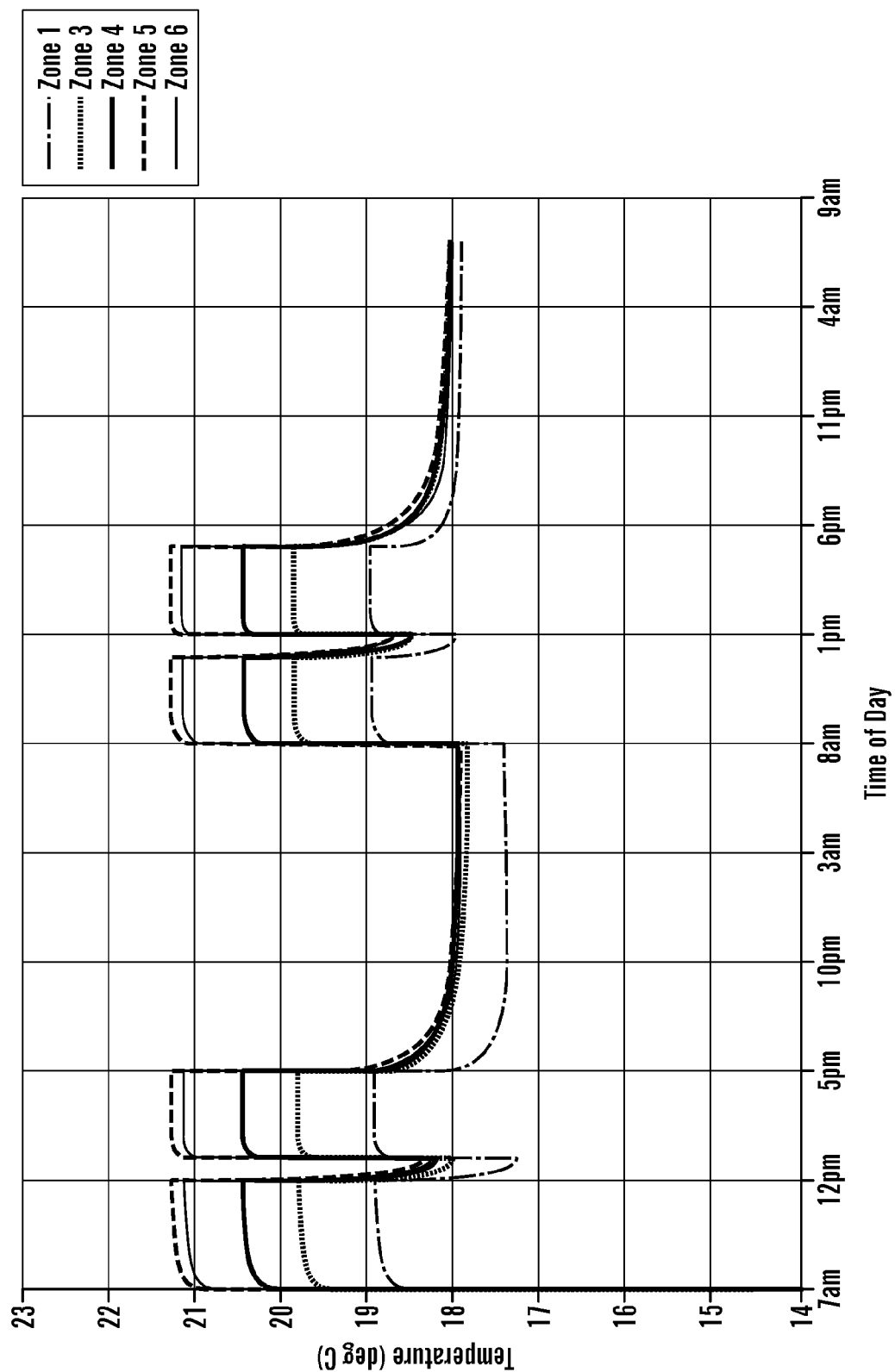
FIG. 10 depicts a further plot of temperatures in different zones according to embodiments.

In FIG. 10, the temperature dynamics of a more complex occupancy schedule are presented. The occupants of each zone arrive at 7 am on day 1, take an hour long lunch break at 12 pm and leave for the day at 5 pm. On the next day the occupants arrive at 8 am, take the lunch break at noon and leave at 5 pm. When the zones are unoccupied, the system goes into an energy saving mode during which the zonal temperatures start sliding to the ambient temperature. Zonal occupancy can be obtained via user location tracking system 24, using real-time sensors 40, user behavior data 32, or offline scheduling, etc.

In a further approach, equation (8) can be re-written as:

$$y_{ss} = M_1 T\infty + M_2 u \quad (12)$$

where $M_1 = B^T A^{-1} B_0$ and $M_2 = B^T A^{-1} B$. This suggests that the temperature vector is a function of the ambient temperature T∞ and the energy (heat/cool) input u. In a generic single family home/apartment layout there is typically a central thermostat controller setting Θ that determines the energy input to the different zones (rooms) within the house. In a typical embodiment, the central controller may be known to unevenly heat/cool the rooms as the energy input to each zone is further affected by parameters such as vent locations, open/partially-open/closed state of vents, insulation of windows, and other miscellaneous sources of energy input (e.g., personal heaters, etc.). The energy input vector u is thus a complex nonlinear function of the central thermostat setting Θ, the ambient temperature T∞, as well as other parameters v, $$u = f(\Theta, T\infty, v_1, v_2, \ldots). \tag{13}$$

For the purpose of this approach, it is assumed that the other parameters are invariant and u as linear function of Θ and T∞ is proposed.

$$u = M_3 \Theta + M_4 T\infty + M_5. \tag{14}$$

Combining equations (12) and (14), the zonal temperature vector y can be expressed as a linear function of Θ and T∞.

$$y_{ss} = F(\Theta, T\infty) \tag{15}$$

Learning this linear dependency of y on Θ and T∞ can be posed as a system identification problem. Assume each bedroom comprises a different zone, with the corresponding family member occupying the bedroom having their personal temperature preference. There is a discomfort function D(·) associated with each family member's temperature preference. Each family member's discomfort to a particular central thermostat setting can be calculated once the temperature preference of the member and the current temperature of the corresponding bedroom are known. Thus an optimal thermostat setting would correspond to the minimum of the sum total discomfort to all the members, as expressed in equation (3). Once the system dynamics are identified, temperature of each zone can be expressed in terms of Θ given T∞ and an optimal Θ can be calculated by minimizing the sum total of user discomforts.

Figure 11:
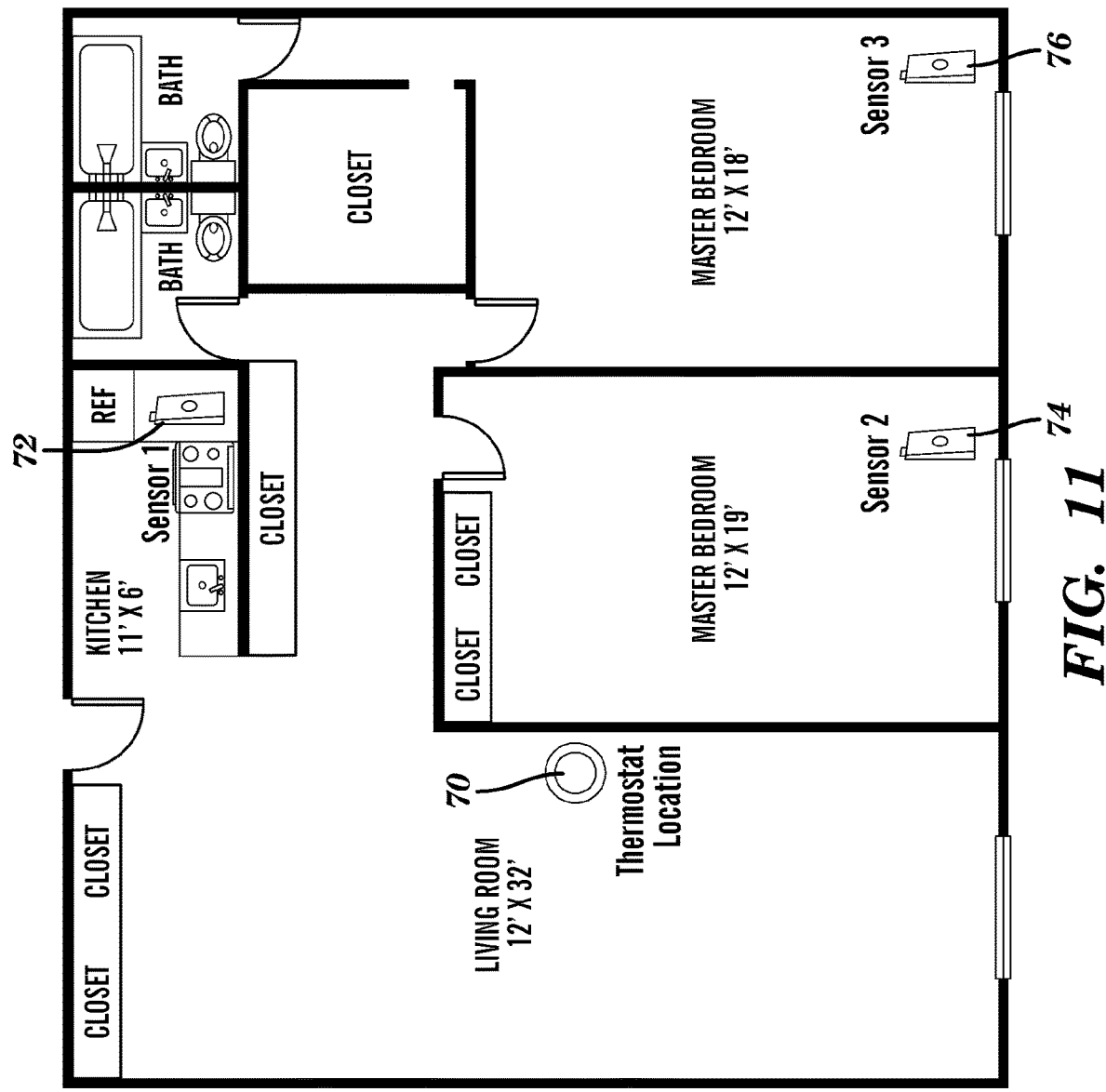
FIG. 11 depicts a zone floorplan of a space with sensors and a thermostat according to embodiments.

In an illustrative embodiment involving the system identification approach. Real-time temperature sensing may be collected with, e.g., a Texas Instrument's CC2541 wireless microcontroller based smart SensorTag. The SensorTag uses Bluetooth low energy to communicate and update the temperature sensor reading to the smart phone application 42. The layout of the two bedroom apartment is as depicted in FIG. 11, and three SensorTags 72, 74, 76 are used within the apartment to obtain the corresponding temperature readings of the zones. The three sensor readings comprise the temperature vector y=[y1 y2 y3]. The thermostat 70 location is also indicated in FIG. 11. The thermostat setting Θ corresponds to the central temperature control input for all the three zones.

In an adaptive learning phase (provided by adaptive learning system 16), temperature data of the three zones is collected corresponding to different thermostat settings and ambient conditions with sample results presented in Table 5 in FIG. 12. Note that the temperature gradient was created by having the window next to Sensor-3 location slightly opened and hence having a significant direct influence from the ambient temperature. Using the learned results from Table 5, a linear mathematical correlation model 18 of the system can be constructed. The thermostat setting (Θ) and the ambient temperature (T∞) serve as input to the system, and the temperature vector (y) corresponding to the sensor readings of the three zones constitutes the system output.

Using the constructed correlation model 18, a control phase takes the temperature input preference 36 from two users, one located in the Sensor 2 bedroom ($x_2$) and the other in the Sensor 3 bedroom ($x_3$). Based on the received user temperature preference 37, the optimal set-point (Θ) for the central thermostat of the apartment is determined by optimization system 22.

Consider the preference 36 of the occupants as $x_2 = 22$ degrees C. and $x_3 = 20$ degrees C. Then the discomfort functions takes the form $D_2 = (y_2 - x_2)^2$ and $D_3 = (y_3 - x_3)^2$. During the control phase, assume T∞=−4 degrees C. Using the system dynamics identified from the adaptive learning phase, $y_2$ and $y_3$ are expressed in terms of Θ. Minimizing the sum of discomfort functions then gives us the optimal setting Θ*.

Using experiment results, a value of Θ*=23.6 degrees C. is obtained. Setting the thermostat control to 23.6 degrees C. drives the bedroom temperatures to $y_2 = 23.1$ degrees C. and $y_3 = 18.3$ degrees C.

Based on the system identification to achieve $y_2 = x_2 = 22$ degrees C., one would need to set Θ=22.3 degrees C. and to achieve $y_3 = x_3 = 20$ degrees C., one would need to set Θ=25.8 degrees C. This implies that $y_2 = 22$ degrees C. and $y_3 = 20$ degrees C. is not achievable simultaneously. Hence, the Θ*=23.6 degrees C. arrived at by the consensus algorithm 48 is the optimal setting that minimizes the collective discomfort of the occupants.

Referring again to FIG. 1, aspects of the CEM system 10 may be implemented on one or more computing systems, e.g., with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the computer, partly on the computer, as a stand-alone software package, partly on the computer and partly on a remote device or entirely on the remote device or server. In the latter scenario, the remote device may be connected to the computer through any type of network, including wireless, a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computing platform for running CEM system 10 may comprise any type of computing device and, and for example include at least one processor, memory, an input/output (I/O) (e.g., one or more I/O interfaces and/or devices), and a communications pathway. In general, processor(s) execute program code which is at least partially fixed in memory. While executing program code, the processor(s) can process data, which can result in reading and/or writing transformed data from/to memory and/or I/O for further processing. The pathway provides a communications link between each of the components in computing system. I/O can comprise one or more human I/O devices, which enable a user or other system to interact with computing system. The described repositories may be implementing with any type of data storage, e.g., databases, file systems, tables, etc.

Furthermore, it is understood that the CEM system 10 or relevant components thereof (such as an API component) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A collaborative energy management system for a multi-zone space, comprising:
    at least one computing device in communication with an HVAC system and including computer readable program instructions that comprise:

an adaptive learning system that collects environment data from a plurality of environment sensors located throughout the multi-zone space and generates a correlation model that correlates historical environment data with HVAC settings;

an optimization system that utilizes the correlation model and a consensus algorithm, the consensus algorithm incorporating a usage reporting system and energy usage goals, the optimization system configured to periodically generate new HVAC settings for application by the HVAC system for the multi-zone space, and the usage reporting system generating an individualized pricing signal for each of a plurality of occupants based on inputted preferences received from each of the plurality of occupants within the multi-zone space, wherein the usage reporting system generates the individualized pricing signal for each of the plurality of occupants by utilizing a discomfort cost incurred to the set of co-occupants due to the inputted preference of a selected occupant and an incremental energy cost to the multi-zone space to accommodate the inputted preference of the occupant;

wherein the discomfort cost is calculated by summing the values of a set of discomfort functions, each function corresponding to an occupant in the set of co-occupants, wherein each discomfort function is a relationship between the corresponding occupant's level of discomfort and an ambient temperature, and wherein each of the discomfort function values used in the discomfort cost results from the inputted preference of the corresponding selected occupant;

wherein the individualized pricing signal generated for each occupant is transmitted to that occupant.

2. The collaborative energy management system of claim 1, further comprising a user location tracking system determining location information for each of the plurality of occupants using one or more of: one or more tracking sensors in the multi-zone space, user behavior data, user device location information, and ancillary data, the location information being used by the optimization system.

3. The collaborative energy management system of claim 1, wherein the consensus algorithm utilizes a minimization function that minimizes both the discomfort function of each occupant based on the inputted preferences received from a plurality of occupants within the multi-zone space and minimizes an overall energy cost function of the multi-zone space.

4. The collaborative energy management system of claim 1, wherein the HVAC settings comprise a temperature setting.

5. The collaborative energy management system of claim 1, wherein the preferences are received from a remotely running application.

6. The collaborative energy management system of claim 1, wherein optimization system further utilizes a heat transfer model to model an environmental behavior of the multi-zone space.

7. The collaborative energy management system of claim 1, wherein the individualized pricing signal provides each of the plurality of occupants with individual feedback about energy consumption costs based on the inputted preferences.

8. The collaborative energy management system of claim 1, further comprising providing each of the individualized pricing signals to an administrator and establishing a common temperature set-point for each zone within the multi-zone space.

9. A method of providing collaborative energy management in a multi-zone space, comprising:

collecting environment data from sensors in the multi-zone space to generate a correlation model that correlates historical environment data with HVAC settings;

receiving preferences from a plurality of occupants within the multi-zone space;

generating individualized pricing signals for each of the plurality of occupants wherein each individualized pricing signal is based on a discomfort cost incurred to a set of co-occupants due to a temperature preference of a selected occupant received from the selected occupant and an incremental energy cost to the space to accommodate the preference received from the selected occupant, wherein the discomfort cost is calculated by summing the values of a set of discomfort functions, each function corresponding to an occupant in the set of co-occupants, wherein each discomfort function is a relationship between the corresponding occupant's level of discomfort and an ambient temperature, and wherein each of the discomfort function values used in the discomfort cost results from the inputted preference of the corresponding selected occupant;

transmitting the individualized pricing signal generated for each occupant to that occupant;

receiving energy usage goals for the multi-zone space;

calculating new HVAC settings for the multi-zone space utilizing the correlation model and a consensus algorithm incorporating the individualized pricing signals for each of the plurality of occupants and the energy usage goals; and applying the HVAC settings to an HVAC system associated with the multi-zone space.

10. The method of claim 9, further comprising determining location information for each of the plurality of occupants, the location information being used by the consensus algorithm to calculate the HVAC settings.

11. The method of claim 9, wherein the consensus algorithm utilizes a minimization function that seeks to minimize both the discomfort function of each occupant and an overall energy cost function of the multi-zone space.

12. The method of claim 9, wherein the HVAC settings comprise a temperature setting.

13. The method of claim 9, wherein the preferences are received from remotely running mobile applications.

14. The method of claim 9, wherein calculating the HVAC settings includes using a heat transfer model to model an environmental behavior of the multi-zone space.

15. A computer program product stored on a non-transitory computer readable storage medium, which when executed by a computer system, provides collaborative energy management in a multi-zone space, comprising:

program code that collects environment data from sensors in the multi-zone space to generate a correlation model that correlates historical environment data with HVAC settings;

program code that receives preferences from a plurality of occupants within the multi-zone space;

program code that receives energy goals for the multi-zone space;

program code for generating individualized pricing signals for each of the plurality of occupants, wherein each individualized pricing signal is based on a discomfort cost incurred to a set of co-occupants due to a temperature preference of a selected occupant received from the selected occupant and an incremental energy cost to the space to accommodate the preference received from the selected occupant, wherein the discomfort cost is calculated by summing the values of a set of discomfort functions, each function corresponding to an occupant in the set of co-occupants, wherein each discomfort function is a relationship between the corresponding occupant's level of discomfort and an ambient temperature, and wherein each of the discomfort function values used in the discomfort cost results from the inputted preference of the corresponding selected occupant;

program code that transmits the individualized pricing signal generated for each occupant to that occupant;

program code that calculates new HVAC settings for the multi-zone space utilizing the correlation model and a consensus algorithm incorporating the individualized pricing signals for each of the plurality of occupants and the energy goals;

and program code that outputs the HVAC settings to an HVAC system associated with the multi-zone space for application by the HVAC system.

16. The program product of claim 15, further comprising program code for determining location information for each of the plurality of occupants, the location information being used by the consensus algorithm to calculate the HVAC settings.

17. The program product of claim 15, wherein the consensus algorithm utilizes a minimization function that seeks to minimize both the discomfort function of each occupant and an overall energy cost function of the multi-zone space.

18. The program product of claim 15, wherein the HVAC settings comprise a temperature settings.

19. The program product of claim 15, wherein the preferences are received from remotely running mobile applications.

20. The program product of claim 15, wherein calculating the HVAC settings includes using a heat transfer to model an environmental behavior of the multi-zone space.

* * * * *